(12) United States Patent
Kim

(10) Patent No.: US 9,551,902 B2
(45) Date of Patent: Jan. 24, 2017

(54) LIQUID CRYSTAL DISPLAY WITH AN ALIGNMENT CONTROL LAYER CONTAINING POLYMERIZED MESOGEN AND A MANUFACTURING METHOD OF THE LIQUID CRYSTAL DISPLAY

(75) Inventor: Jae-Hoon Kim, Gyeonggi-do (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 398 days.

(21) Appl. No.: 13/635,051

(22) PCT Filed: Sep. 14, 2010

(86) PCT No.: PCT/KR2010/006274
§ 371 (c)(1),
(2), (4) Date: Nov. 14, 2012

(87) PCT Pub. No.: WO2011/115338
PCT Pub. Date: Sep. 22, 2011

(65) Prior Publication Data
US 2013/0050624 A1 Feb. 28, 2013

(30) Foreign Application Priority Data
Mar. 16, 2010 (KR) .................. 10-2010-0023415

(51) Int. Cl.
*G02F 1/1337* (2006.01)
(52) U.S. Cl.
CPC ............. *G02F 1/133711* (2013.01); *G02F 2001/133726* (2013.01)

(58) Field of Classification Search
CPC ............ G02F 1/133788; G02F 1/1337; G02F 1/133711; G02F 2001/133726
USPC .................................. 349/123–136
See application file for complete search history.

(56) References Cited

U.S. PATENT DOCUMENTS

| | | | |
|---|---|---|---|
| 6,201,588 B1 * | 3/2001 | Walton | G02F 1/133711 349/123 |
| 6,512,569 B1 * | 1/2003 | Acosta | G02F 1/133753 349/129 |
| 7,326,449 B2 * | 2/2008 | Geisow | C09K 19/38 349/127 |
| 7,867,580 B2 | 1/2011 | Sawatari et al. | |
| 2004/0080685 A1 | 4/2004 | Yamada et al. | |

(Continued)

FOREIGN PATENT DOCUMENTS

JP 2004-286984 A 10/2004
KR 20070029100 A 3/2007
(Continued)

*Primary Examiner* — Charles Chang
(74) *Attorney, Agent, or Firm* — Osha Liang LLP

(57) ABSTRACT

Provided is a liquid crystal display device. The liquid crystal display device includes a first substrate and a second substrate configured to face each other, a liquid crystal layer positioned between the first and second substrates, a first alignment film positioned between the liquid crystal layer and the first substrate, and a second alignment film positioned between the liquid crystal layer and the second substrate. Here, at least one of the first alignment film and the second alignment film includes a double layer of an alignment base film that is aligned so as to have a pretilt angle and an alignment control film that has polymerized mesogen.

14 Claims, 12 Drawing Sheets

(56) References Cited

U.S. PATENT DOCUMENTS

| | | | |
|---|---|---|---|
| 2004/0138408 A1* | 7/2004 | Harris | C08G 73/10 |
| | | | 528/354 |
| 2008/0160222 A1 | 7/2008 | Harding et al. | |
| 2010/0045886 A1* | 2/2010 | Kwak | G02F 1/133351 |
| | | | 349/40 |
| 2011/0164213 A1* | 7/2011 | Nakanishi et al. | 349/129 |
| 2011/0234955 A1* | 9/2011 | Mizusaki et al. | 349/123 |
| 2011/0261295 A1* | 10/2011 | Kim | G02F 1/133707 |
| | | | 349/96 |

FOREIGN PATENT DOCUMENTS

| | | |
|---|---|---|
| KR | 2007-0071340 A | 7/2007 |
| KR | 2008-0052190 A | 6/2008 |

* cited by examiner

Fig. 1
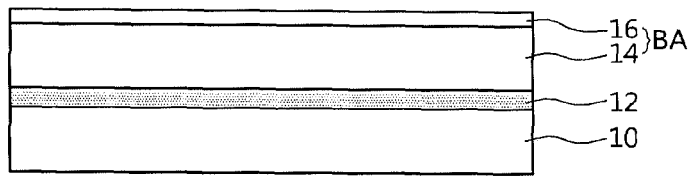
Fig. 2
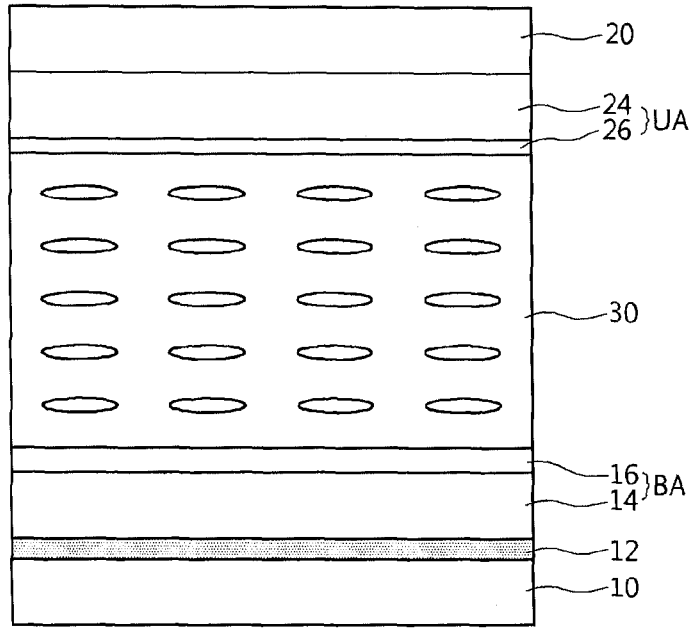
Fig. 3
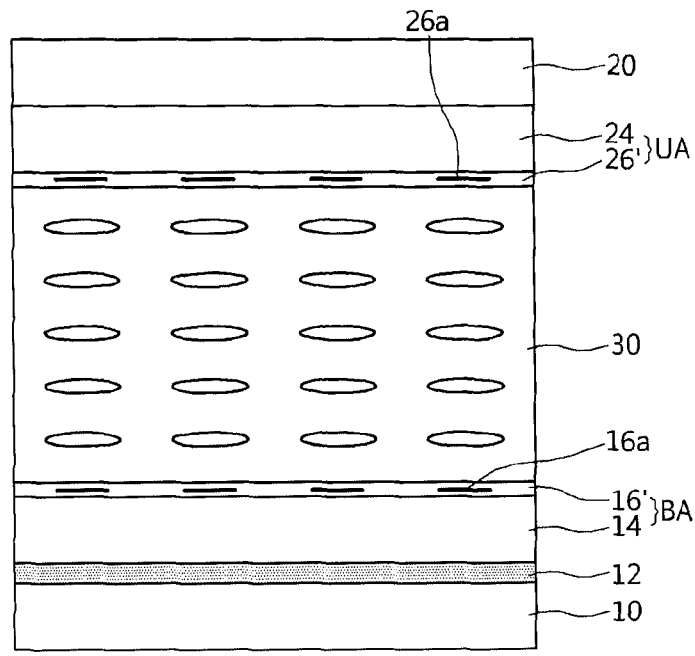

LIQUID CRYSTAL DISPLAY WITH AN ALIGNMENT CONTROL LAYER CONTAINING POLYMERIZED MESOGEN AND A MANUFACTURING METHOD OF THE LIQUID CRYSTAL DISPLAY

TECHNICAL FIELD

The present invention relates to a display device, and more particularly, to a liquid crystal display device.

BACKGROUND ART

A liquid crystal display device as one kind of flat panel display device has been widely used due to advantages such as reduction in thickness and weight and lower power consumption compared to other flat panel display devices.

An alignment film in the liquid crystal display device has been introduced so that liquid crystal molecules within a liquid crystal layer are arranged to have a specific pretilt angle. However, the alignment film that is currently being used is difficult to give sufficient anchoring force to the liquid crystal molecules, and thereby may be an obstacle factor to improving response speed and display quality.

DISCLOSURE

Technical Problem

The present invention is directed to providing a liquid crystal display device which may improve response speed and display quality.

Technical Solution

One aspect of the present invention provides a liquid crystal display device including: a first substrate and a second substrate configured to face each other; a liquid crystal layer positioned between the first and second substrates; a first alignment film positioned between the liquid crystal layer and the first substrate; and a second alignment film positioned between the liquid crystal layer and the second substrate. Here, at least one of the first alignment film and the second alignment film may include a double layer of an alignment base film that is aligned so as to have a pretilt and an alignment control film that has polymerized mesogen.

The alignment control film may have a phase delay value of not more than 0.1 times the phase delay value of the liquid crystal layer.

The alignment control film may have a larger anchoring energy than the alignment base film.

The alignment base film may be a film that is optically aligned.

The liquid crystal display device may further include a first electrode and a second electrode positioned between the first alignment film and the first substrate. Here, the liquid crystal layer may include a liquid crystal having positive dielectric anisotropy. In this case, the liquid crystal display device may implement an IPS mode or an FFS mode.

The polar angle of the pretilt angle of the alignment base film and the polar angle of a pretilt angle of the alignment control film may be different from each other.

The liquid crystal display device may further include a first electrode positioned between the first alignment film and the first substrate; and a second electrode positioned between the second alignment film and the second substrate. Here, the liquid crystal layer may include a liquid crystal having positive dielectric anisotropy. In this case, the liquid crystal display device may implement a TN mode, an OCB mode, or an ECB mode.

The polar angle of the pretilt angle of the alignment control film may be larger than the polar angle of a pretilt angle of the alignment base film.

The liquid crystal display device may further include a first electrode positioned between the first alignment film and the first substrate; and a second electrode positioned between the second alignment film and the second substrate. Here, the liquid crystal layer may include a liquid crystal having negative dielectric anisotropy. In this case, the liquid crystal display device may implement a VA mode.

The polar angle of a pretilt angle of the alignment control film may be smaller than the polar angle of a pretilt angle of the alignment base film.

The alignment base film may include a first domain having a first alignment direction, and a second domain having a second alignment direction.

The polymerized mesogen may be obtained in such a manner that reactive mesogen represented by the following Chemical Formula 1 is polymerized.

$$P1\text{-}A1\text{-}(Z1\text{-}A2)n\text{-}P2, \qquad \text{[Chemical Formula 1]}$$

where P1 and P2 are separately selected from a group consisting of acrylate, methacrylate, vinyl, vinyloxy, and epoxy, A1 and A2 are separately selected from a group consisting of 1,4-phenylen and naphthalene-2,6-diyl, Z1 denotes one of COO—, OCO—, and a single bond, and n denotes one of 0, 1, and 2.

The reactive mesogen may be any one represented by the following Chemical Formulas 2 to 4:

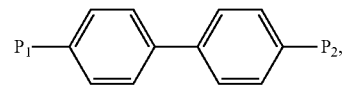

[Chemical Formula 2]

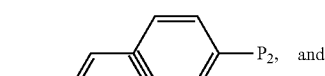

[Chemical Formula 3]

and

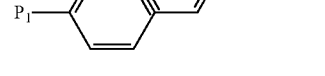

[Chemical Formula 4]

where P1 and P2 are separately selected from a group consisting of acrylate, methacrylate, vinyl, vinyloxy, and epoxy.

Another aspect of the present invention provides a manufacturing method of a liquid crystal display device, including: forming a first alignment base film aligned on a first substrate so as to have a pretilt angle; forming a first reactive mesogen film containing reactive mesogen on the first alignment base film; combining a second substrate and the first substrate on which the first alignment base film and the first reactive mesogen film are formed; forming a liquid crystal layer between the combined first and second substrates; and polymerizing the reactive mesogen within the first reactive mesogen film to thereby form a first alignment control film including the polymerized mesogen.

The polymerizing may be performed in a state in which an electric field is applied to the reactive mesogen film.

The applying of the electric field may be performed after the liquid crystal layer is formed in such a manner that the electric field is applied between a first electrode and a second electrode which are formed on at least one of the substrates.

The polymerizing may be performed in such a manner that the reactive mesogen film is irradiated with light.

The polymerizing may be performed after the liquid crystal layer is formed.

The polymerizing may be performed before the first substrate and the second substrate are combined.

The reactive mesogen film may be formed using a mixture containing the reactive mesogen and a solvent.

The mixture used in forming the reactive mesogen film may further contain a polymerization initiator.

The reactive mesogen may be contained at 1 wt % or less with respect to the entire weight of the mixture used in forming the reactive mesogen film.

When polymerizing the reactive mesogen within the reactive mesogen film, the solvent may remain within the reactive mesogen film.

The manufacturing method may further include, before combining the first substrate and the second substrate, forming a second alignment base film aligned on the second substrate so as to have a pretilt angle; forming a second reactive mesogen film containing reactive mesogen on the second alignment base film; and polymerizing the reactive mesogen within the second reactive mesogen film to thereby form a second alignment control film including the polymerized mesogen.

Advantageous Effects

In a liquid crystal display device according to an exemplary embodiment of the present invention, enhanced anchoring energy is exerted on the liquid crystal adjacent to the alignment control film by the alignment control film containing the polymerized mesogen, and therefore a director of the liquid crystal may be stabilized or fixed. As a result, a threshold voltage of the liquid crystal display device may be reduced, response speed may be improved, and display quality may be improved due to improved black visibility.

DESCRIPTION OF DRAWINGS

FIGS. 1 to 3 are cross-sectional views showing a manufacturing method of a liquid crystal display device according to an exemplary embodiment of the present invention;

MODES OF THE INVENTION

Figure 4:
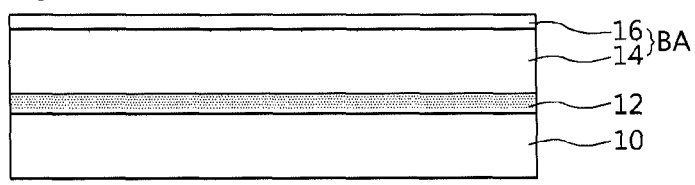
FIGS. 4 to 7 are cross-sectional views showing a manufacturing method of a liquid crystal display device according to another exemplary embodiment of the present invention.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

FIGS. 1 to 3 are cross-sectional views showing a manufacturing method of a liquid crystal display device according to an exemplary embodiment of the present invention.

Referring to FIG. 1, a first substrate 10 is provided. The first substrate 10 may be a light transmitting substrate, for example a glass substrate. A first electrode 12 and a second electrode (not shown) which are parallel to each other may be formed on the first substrate 10. In an operating process of a liquid crystal display device, an electric field is formed between the first electrode 12 and the second electrode. Before forming the electrodes 12, thin film transistors (not shown) may be formed on the first substrate 10. In this case, the electrodes 12 may be electrically connected with the thin film transistors, respectively. The electrodes 12 may be a transparent conductive film such as indium tin oxide (ITO), indium zinc oxide (IZO), or the like.

A first alignment base film 14 may be formed on the electrodes 12. The first alignment base film 14 may be formed using poly-amic acid, poly-imide, lecithin, nylon, or polyvinylalcohol (PVA). The first alignment base film 14 is a film that is aligned by a physical rubbing method, an optical alignment method, or a groove patterning method, and a film that has a pretilt angle to thereby enable liquid crystal (or mesogen) to be aligned.

In the present invention, the pretilt angle may have an angle and a direction, and hereinafter, the angle and the direction may be respectively defined as a polar angle (0 to 180) and an azimuthal angle (0 to 360). That is, the pretilt angle may be interpreted as meaning that both the azimuthal angle (0 to 360) and the polar angle (0 to 180) are included. Here, the azimuthal angle may denote an angle in which a director of a liquid crystal (or mesogen) is tilted with respect to a reference of any one direction on a plane parallel to the substrate. Meanwhile, the polar angle may denote an angle between the plane parallel to the substrate and the director of the liquid crystal (or mesogen).

The first alignment base film 14 may be a horizontal alignment base film, a vertical alignment base film, or a double-layer thereof. The horizontal alignment base film may be a film that may apply a polar angle of about 4 to 5 degrees to the liquid crystal (or mesogen), and the vertical alignment base film may be a film that may apply a polar angle of about 89 to 90 degrees to the liquid crystal (or mesogen). When the first alignment base film 14 is the double-layer of the horizontal alignment base film and the vertical alignment base film, the polar angle which is applied to the liquid crystal (or mesogen) by the first alignment base film 14 may be controlled by adjusting the laminated order of the two alignment base films and the each thickness thereof. As an example, when the first alignment base film 14 is a film obtained such that the horizontal alignment base film and the vertical alignment base film are sequentially laminated, and the thickness of the vertical alignment base film is larger than the thickness of the horizontal alignment base film, the polar angle which is applied to the liquid crystal (or mesogen) by the first alignment base film 14 may be increased, and the polar angle applied to the liquid crystal (or mesogen) by the first alignment base film 14 may be reduced by controlling the thickness of the vertical alignment base film to be smaller than the thickness of the horizontal alignment base film.

When a plurality of domains are formed, the azimuthal angle of the pretilt angle applied to the liquid crystal (or mesogen) for each domain may differ, and a combination of the vertical alignment base film and the horizontal alignment base film in the plurality of domains is made different, and therefore the polar angle of the pretilt angle applied to the liquid crystal (or mesogen) for each domain may differ. In this case, a multi-domain structure may be realized.

As an example, the first alignment base film 14 is formed so that the polar angle of the pretilt angle applied to the liquid crystal (or mesogen) is be less than 2 degrees. As another example, dispositions of the first electrode 12 and the second electrode are made different for each domain, and therefore directions of electric fields generated between the first electrode 12 and the second electrode may different for each domain. In this case, an angle formed between the electric field direction generated between the first electrode 12 and the second electrode and the azimuthal angle of the pretilt angle applied by the first alignment base film 14, are made different for each domain, and therefore a multi-domain structure may be realized.

A first reactive mesogen film 16 may be formed on the first alignment base film 14. The first alignment base film 14 and the first reactive mesogen film 16 may form a first alignment film (BA).

The first reactive mesogen film 16 may be formed by applying, on the first alignment base film 14, a mixture in which reactive mesogen is mixed in a solvent. The reactive mesogen may contain monomer or oligomer exhibiting liquid crystal property, and polymerizable end groups which are respectively combined on both end sides of the mesogen. The mesogen may be calamitic mesogen formed in a rod shape or a plate shape, and otherwise, may be discotic mesogen formed in a disk shape. The end groups may be independently acrylate, methacrylate, vinyl, vinyloxy, or epoxy.

As an example of the reactive mesogen, a compound represented by the following Chemical Formula 1 may be given.

P1-A1-(Z1-A2)n-P2 [Chemical Formula 1]

Here, P1 and P2 are separately selected from a group consisting of acrylate, methacrylate, vinyl, vinyloxy, and epoxy, A1 and A2 are separately selected from a group consisting of 1,4-phenylen and naphthalene-2,6-diyl, Z1 denotes one of COO—, OCO—, and a single bond, and n denotes one of 0, 1, and 2.

Specifically, a compound represented by one of the following Chemical Formulas may be given.

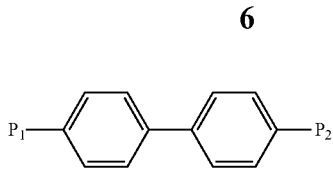
[Chemical Formula 2]

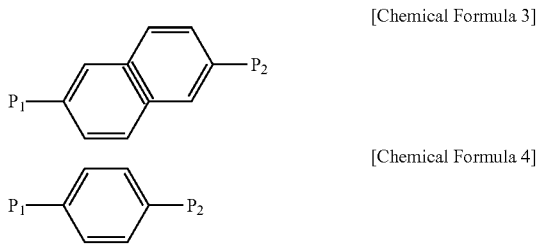
[Chemical Formula 3]

[Chemical Formula 4]

Here, P1 and P2 are separately selected from a group consisting of acrylate, methacrylate, vinyl, vinyloxy, and epoxy.

In addition, as examples of the solvent for forming the first reactive mesogen film 16, propylene glycol methyl ether acetate (PGMEA) or aromatic solvent such as toluene or xylene may be given.

A polymerization initiator may be further included in the mixture of the reactive mesogen and the solvent for forming the first reactive mesogen film 16. Other than methyl ethyl ketone peroxide, the polymerization initiator may be, for example, benzoyl peroxide, cumene hydroperoxide, t-butylperoctoate, dicumyl peroxide, or benzoyl alkyl ethers, acetophenones, benzophenones, xanthones, benzoin ethers, or benzyl ketals.

The reactive mesogen may be contained at 1 wt % or less with respect to the entire weight of the mixture for forming the first reactive mesogen film 16. In addition, the thickness of the first reactive mesogen film 16 may be several or several tens of nm. On the other hand, the thickness of the first alignment base film 14 may be several hundreds of ran.

The mesogen within the first reactive mesogen film 16 may be arranged in accordance with the pretilt angle applied to the first alignment base film 14. Specifically, as to the mesogen within the first reactive mesogen film 16, the azimuthal angle of the director of the mesogen is arranged in accordance with an azimuthal angle of the pretilt angle applied to the first alignment base film 14, and the first polar angle of the director of the mesogen may be determined in accordance with the polar angle of the pretilt angle applied to the first alignment base film 14.

As described above, when the first alignment base film 14 is formed in such a manner that the polar angle of the pretilt angle applied to the liquid crystal (or mesogen) is less than 2 degrees, the first polar angle of the mesogen within the reactive mesogen film 16 may be less than 2 degrees.

Next, the first substrate 10 is subjected to heat treatment, thereby removing the solvent within the first reactive mesogen film 16. In this instance, the heat treatment may be carried out at a temperature of 60 degrees for 90 seconds. However, the process of removing the solvent may be omitted.

Referring to FIG. 2, on the second substrate 20, a second alignment base film 24 and a second reactive mesogen film 26 containing reactive mesogen may be sequentially formed. The second alignment base film 24 and the second reactive mesogen film 26 may form a second alignment film (UA). A material or method of forming the second alignment base film 24 and the second reactive mesogen film 26 may be the same as a material or method of forming the first alignment base film 14 and the first reactive mesogen film 16 which have been described with reference to FIG. 1. However, the present invention is not limited thereto, and any one of the first reactive mesogen film 16 and the second reactive mesogen film 26 may be omitted.

Thereafter, a liquid crystal charging area is defined by applying a sealant to any one of the first substrate 10 and the second substrate 20, and in this instance, a liquid crystal injection port may be formed together. Next, the first substrate 10 and the second substrate 20 are aligned and then combined so that the second alignment base film 24 faces the first substrate 10. Next, the liquid crystal injection port is immersed in a liquid crystal reservoir in a vacuum state, the vacuum state is released, liquid crystal is injected into the liquid crystal charging area to thereby form a liquid crystal layer 30, and then the liquid crystal injection port is sealed. In this instance, the reactive mesogen may be injected into the liquid crystal charging area together with the liquid crystal. The liquid crystals that form the liquid crystal layer 30 may be liquid crystals having positive dielectric anisotropy, and in this case, the liquid crystal display device may be a device of in plain switching (IPS) mode or fringe field switching mode. In this case, the first substrate 10 and the second substrate 20 may be combined so that the azimuthal angles of the pretilt angles of the first alignment base film 14 and the second alignment base film 24 are parallel to each other.

The liquid crystals adjacent to the alignment films BA and UA among the liquid crystals that form the liquid crystal layer 30 may be arranged in accordance with the pretilt angle applied to the alignment films BA and UA, specifically, the pretilt angle applied to the alignment base films 14 and 24 and/or the reactive mesogen within the reactive mesogen films 16 and 26. As described above, when the first polar angle of the pretilt angle applied to the alignment base films 14 and 24 and/or the reactive mesogen within the reactive mesogen films 16 and 26 is less than 2 degrees, the polar angle of the director of the liquid crystals adjacent to the alignment films BA and UA among the liquid crystals forming the liquid crystal layer 30 may be nearly horizontal with respect to the substrates 10 and 20.

Referring to FIG. 3, the first reactive mesogen film 16 and/or the second reactive mesogen film 26 is irradiated with light such as UV or the like, the reactive mesogen within the reactive mesogen films 16 and 26 is polymerized, that is, optically polymerized, and therefore first and second alignment control films 16' and 26' containing the polymerized mesogen 16a and 26a are formed. The irradiation of the light is performed for about 30 minutes. In this instance, the polymerized mesogen 16a and 26a formed within the alignment control films 16' and 26' may have an arrangement corresponding to the pretilt angle applied by the alignment base films 14 and 24. In particular, as described above, in a case where the process of removing the solvent within the reactive mesogen films 16 and 26 is omitted, the solvent may remain in the reactive mesogen films 16 and 26 when optically polymerizing the reactive mesogen within the reactive mesogen films 16 and 26. In this case, the polymerized mesogen 16a and 26a may be arranged so as to further correspond to the pretilt angle applied by the alignment base films 14 and 24.

In another embodiment, in a state in which the liquid crystals within the liquid crystal layer 30 are aligned by applying an electric field between the first electrode 12 and the second electrode (not shown), optical polymerization may be carried out.

The alignment control films 16' and 26' may have enhanced anchoring energy compared to the anchoring energy of the alignment base films 14 and 24. In particular, when the alignment base films 14 and 24 are an optically aligned film exhibiting slightly weaker anchoring energy, the anchoring energy may be supplemented or enhanced by the alignment control films 16' and 26'.

In this manner, enhanced anchoring energy is exerted on the liquid crystal adjacent to the alignment control films 16' and 26' by the polymerized mesogen 16a and 26a within the alignment control films 16' and 26', and therefore the director of the liquid crystal may be stabilized or fixed. As a result, a threshold voltage of the liquid crystal display device may be reduced, response speed may be improved, and display quality may be improved due to improved black visibility.

Meanwhile, the phase delay value of any one of the alignment control films 16' and 26' is small so as to avoid substantially affecting the phase delay value of the liquid crystal layer 30. For this, the phase delay value of any one of the alignment control films 16' and 26' may not be more than 0.1 times the phase delay value of the liquid crystal layer 30.

This is represented by the following inequation. For this, the thickness of each of the alignment control films 16' and 26' may be several or several tens of nm.

[Inequation]

$$\Delta nd \le 0.1 \Delta n'd'$$

Here, n and d respectively denote a refractive index and the thickness of the alignment control film, and n' and d' respectively denote a refractive index and the thickness of the liquid crystal layer.

FIGS. 4 to 7 are cross-sectional views showing a manufacturing method of a liquid crystal display device according to another exemplary embodiment of the present invention. The liquid crystal display device according to the present embodiment includes liquid crystal having positive dielectric anisotropy, and a manufacturing method of the liquid crystal display device according to the present embodiment may be similar to the manufacturing method which has been described with reference to FIGS. 1 to 3 excluding the following.

Referring to FIG. 4, the first electrode 12 may be formed on the first substrate 10. Before forming the first electrode 12, a thin film transistor (not shown) may be further formed on the first substrate 10. In this case, the first electrode 12 may be electrically connected with the thin film transistor.

The first alignment base film 14 may be formed on the first electrode 12. The first alignment base film 14 may be formed using poly-auric acid, poly-imide, lecithin, nylon, or PVA. The first alignment base film 14 may be a film that is aligned by a physical rubbing method, an optical alignment method, or a groove patterning method, and a film that has a pretilt angle to thereby enable liquid crystal (or mesogen) to be aligned.

The first alignment base film 14 may be a horizontal alignment base film, a vertical alignment base film, or a double-layer thereof. When the first alignment base film 14 is the double-layer of the horizontal alignment base film and the vertical alignment base film, the polar angle which is applied to the liquid crystal (or mesogen) by the first alignment base film 14 may be controlled by adjusting the laminated order of the two alignment base films, and the thickness thereof. When forming a plurality of domains, the azimuthal angle of the pretilt angle applied to the liquid crystal (or mesogen) is made different for each domain. In addition to this, a combination of the vertical alignment base film and the horizontal alignment base film in the plurality of domains is made different, and therefore the polar angle of the pretilt angle applied to the liquid crystal (or mesogen) for each domain may differ. In this case, a multi-domain structure may be realized. As an example, in the first alignment base film 14, the polar angle of the pretilt angle applied to the liquid crystal (or mesogen) is formed so as to be between 2 and 10 degrees.

The first reactive mesogen film 16 may be formed on the first alignment base film 14. The first alignment base film 14 and the first reactive mesogen film 16 may form a first alignment film BA. The first reactive mesogen film 16 may be formed by applying, on the first alignment base film 14, a mixture in which reactive mesogen is mixed in a solvent. A polymerization initiator may be further contained in the mixture of the reactive mesogen and the solvent for forming the first reactive mesogen film 16. The reactive mesogen may be contained at 1 wt % or less with respect to the entire weight of the mixture for forming the first reactive mesogen film 16. In addition, the thickness of the first reactive mesogen film 16 may be several or several tens of nm.

The mesogen within the first reactive mesogen film 16 may be arranged in accordance with the pretilt angle applied by the first alignment base film 14. Specifically, as to the mesogen within the first reactive mesogen film 16, the azimuthal angle of the director of the mesogen is arranged in accordance with an azimuthal angle of the pretilt angle applied by the first alignment base film 14, and the first polar angle of the director of the mesogen may be determined in accordance with the polar angle of the pretilt angle applied by the first alignment base film 14.

As described above, when the first alignment base film 14 is formed in such a manner that the polar angle of the pretilt angle applied to the liquid crystal (or mesogen) is between 2 and 10 degrees, the first polar angle of the mesogen within the reactive mesogen film 16 may be between 2 and 10 degrees.

Next, the first substrate 10 is subjected to heat treatment, thereby removing the solvent within the first reactive mesogen film 16. However, the process of removing the solvent may be omitted.

Figure 5:
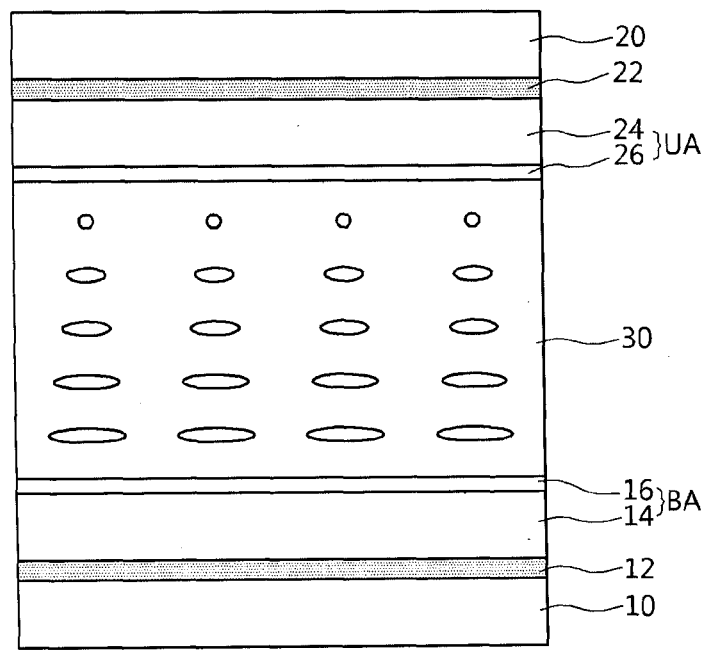

Referring to FIG. 5, on the second substrate 20, a second electrode 22, a second alignment base film 24, and a second reactive mesogen film 26 containing reactive mesogen may be sequentially formed. The second alignment base film 24 and the second reactive mesogen film 26 may form a second alignment film (UA). A material or method of forming the second electrode 22, the second alignment base film 24, and the second reactive mesogen film 26 may be the same as a material or method of forming the first electrode 12, the first alignment base film 14, and the first reactive mesogen film 16 which have been described with reference to FIG. 4. However, the present invention is not limited thereto, and any one of the first reactive mesogen film 16 and the second reactive mesogen film 26 may be omitted.

Thereafter, the first substrate 10 and the second substrate 20 are arranged and then combined so that the second electrode 22 faces the first substrate 10. Next, liquid crystal is injected between the first substrate 10 and the second substrate 20 to thereby form a liquid crystal layer 30. In this instance, reactive mesogen may be injected between the first substrate 10 and the second substrate 20, together with the liquid crystal. The liquid crystals within the liquid crystal layer 30 may be liquid crystals having positive dielectric anisotropy, and for example, may be liquid crystal of a twisted nematic (TN) mode, an optically compensated bend (OCB) mode, or an electrically controlled birefringence (ECB) mode. In the case of the liquid crystal of the TN mode, the first substrate 10 and the second substrate 20 are combined in such a manner that the azimuthal angles of the pretilt angles of the first alignment base film 14 and the second alignment base film 24 intersect with each other, for example, are orthogonal to each other.

Liquid crystals adjacent to the alignment films BA and UA among liquid crystals forming the liquid crystal layer 30 may be arranged in accordance with the pretilt angle applied to the alignment films BA and UA, specifically, the pretilt angle applied to the alignment base films 14 and 25 and/or the reactive mesogen within the reactive mesogen films 16 and 26. As an example, as described above, when the first polar angle of the pretilt angle applied to the alignment base films 14 and 24 and/or the reactive mesogen within the reactive mesogen films 16 and 26 is between 2 and 10 degrees, the polar angle of the liquid crystals adjacent to the alignment films BA and UA among the liquid crystals forming the liquid crystal layer 30 may be between 2 and 10 degrees.

Figure 6:
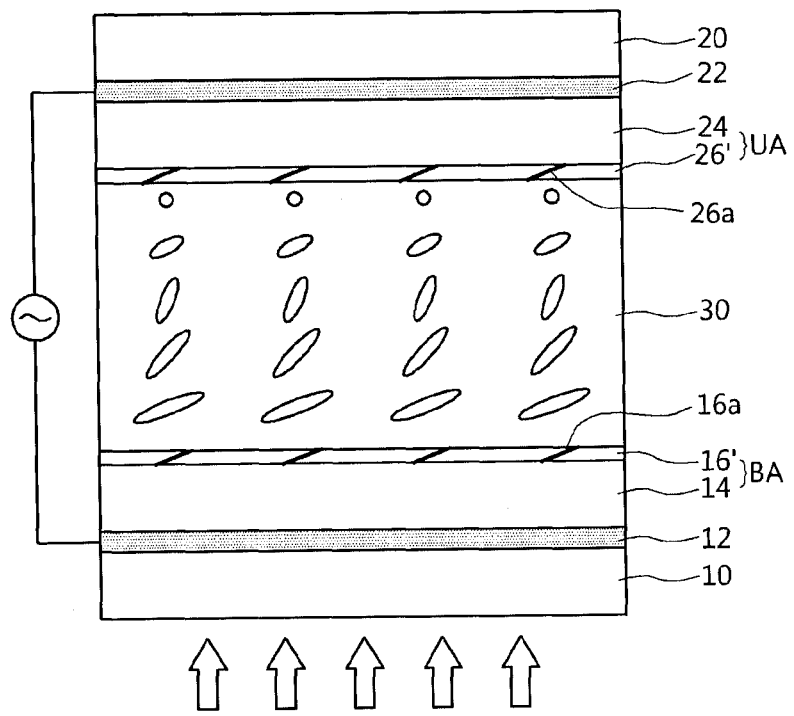

Referring to FIG. 6, by applying an electric field between the first electrode 12 and the second electrode 22, the liquid crystals within the liquid crystal layer 30 may be aligned. Specifically, a director of the liquid crystal having positive dielectric anisotropy is rotated in a direction parallel to an electric field direction. As a result, the polar angles of the liquid crystals adjacent to the alignment films BA and UA among the liquid crystals forming the liquid crystal layer 30 may also be increased, and the polar angle of the reactive mesogen within the reactive mesogen films 16 and 26 may be accordingly increased. However, the rotation degree of the director of the liquid crystal may differ in accordance with the size of the electric field applied between the first electrode 12 and the second electrode 22, and the degree of increase in the polar angle of the reactive mesogen within the reactive mesogen films 16 and 26 may differ.

In this state, the first reactive mesogen film 16 and/or the second reactive mesogen film 26 is irradiated with light such as UV, and the reactive mesogen within the reactive mesogen films 16 and 26 is polymerized, that is, optically polymerized, and therefore the first and second alignment control films 16' and 26' containing the polymerized mesogen 16a and 26a are formed. The irradiation of the light may be carried out for about 30 minutes. In this instance, the alignment control films 16' and 26' may contain the polymerized mesogen 16a and 26a having the pretilt angle corresponding to the arrangement state of the liquid crystals within the liquid crystal layer 30, specifically, a secondary polar angle. Here, by differing the size of the electric field applied between the first electrode 12 and the second electrode 22 and/or a light irradiation amount, the secondary polar angle of the polymerized mesogen 16a and 26a may be controlled. Here, the secondary polar angle of the polymerized mesogen 16a within the first alignment control film 16' may be larger than the polar angle of the first alignment base film 14 adjacent to the first alignment control film 16', and the secondary polar angle of the polymerized mesogen 26a within the second alignment control film 26' may be larger than the polar angle of the second alignment base film 24 adjacent to the second alignment control film 26'.

In another embodiment, the reactive mesogen within the reactive mesogen films 16 and 26 are optically polymerized in a state in which an electric field is not applied between the first electrode 12 and the second electrode 22, thereby forming the first and second alignment control films 16' and 26' containing the polymerized mesogen 16a and 26a. In this case, the mesogen 16a and 26a within the alignment control films 16' and 26' may exhibit a secondary polar angle which is almost the same as the first polar angle applied by the alignment base films 14 and 24. However, the secondary polar angle of the polymerized mesogen may be slightly different from the first polar angle due to a a light irradiation amount during the optical polymerizing step.

Meanwhile, as described above, in a case in which the process of removing the solvent within the reactive mesogen films 16 and 26 is omitted, the solvent may remain in the reactive mesogen films 16 and 26 when optically polymerizing the reactive mesogen within the reactive mesogen films 16 and 26. In this case, the polymerized mesogen 16a and 26a may be arranged so as to further correspond to the arrangement state of the liquid crystals within the liquid crystal layer 30 (in a case of applying an electric field), or arranged so as to further correspond to the pretilt angle applied by the alignment base films 14 and 24 (in a case of not applying the electric field).

Figure 7:
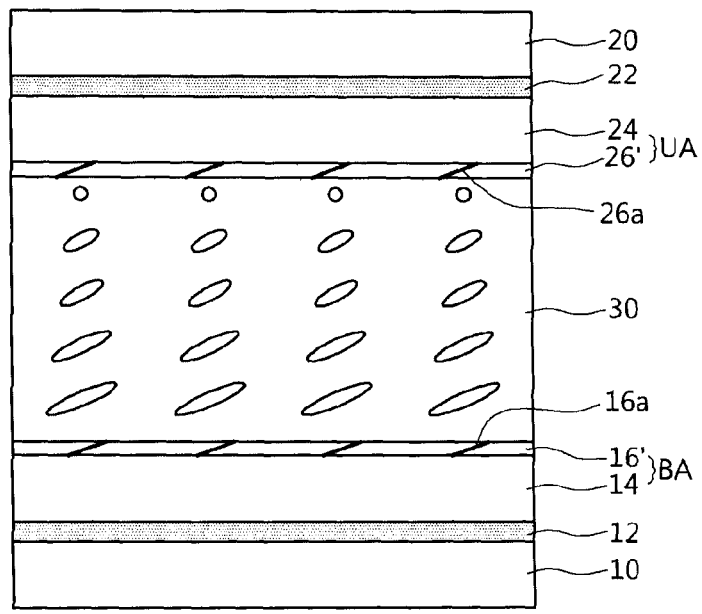

Referring to FIG. 7, the electric field applied between the first electrode 12 and the second electrode 22 is removed. Even after the electric field is removed, the polymerized mesogen 16a and 26a within the alignment control films 16' and 26' may maintain the secondary polar angle, and the alignment control films 16' and 26' may have enhanced anchoring energy compared to the anchoring energy of the alignment base films 14 and 24. In particular, when the alignment base films 14 and 24 are an optically aligned film exhibiting slightly weaker anchoring energy, the anchoring energy may be supplemented or enhanced by the alignment control films 16' and 26'.

In this manner, enhanced anchoring energy is exerted on the liquid crystal adjacent to the alignment control films 16' and 26' by the polymerized mesogen 16a and 26a within the alignment control films 16' and 26', and therefore the director of the liquid crystal may be stabilized or fixed. As a result, a threshold voltage of the liquid crystal display device may be reduced, response speed may be improved, and display quality may be improved due to improved black visibility.

Meanwhile, the phase delay value of any one of the alignment control films 16' and 26' is small so as to avoid substantially affecting the phase delay value of the liquid crystal layer 30. For this, the phase delay value of any one of the alignment control films 16' and 26' may not be more than 0.1 times the phase delay value of the liquid crystal layer 30.

This is represented by the following inequation. For this, the thickness of each of the alignment control films 16' and 26' may be several or several tens of nm,

[Inequation]

$$\Delta n d \leq 0.1 \Delta n' d'$$

Here, n and d respectively denote a refractive index and the thickness of the alignment control film, and n' and d' respectively denote a refractive index and the thickness of the liquid crystal layer.

Figure 8:
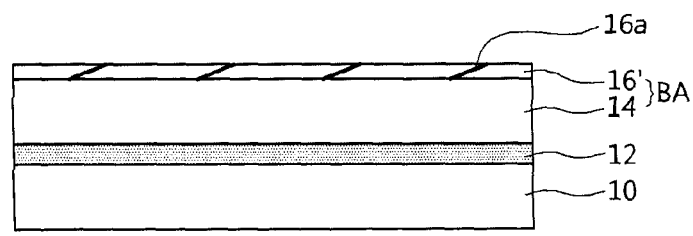
FIGS. 8 and 9 are cross-sectional views showing a manufacturing method of a liquid crystal display device according to still another exemplary embodiment of the present invention.
Figure 9:
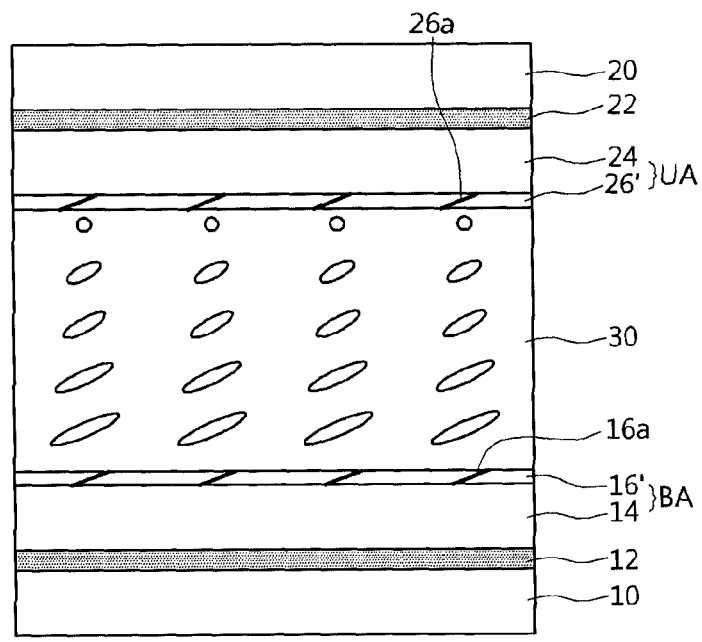

FIGS. 8 and 9 are cross-sectional views showing a manufacturing method of a liquid crystal display device according to still another exemplary embodiment of the present invention. Unlike the manufacturing method described with reference to FIGS. 4 to 7, the manufacturing method according to the present embodiment is characterized in that the reactive mesogen is polymerized in a state in which substrates are not combined, and is substantially the same as the manufacturing method described with reference to FIGS. 4 to 7 excluding the following:

First, as described with reference to FIG. 4, the first electrode 12 is formed on the first substrate 10, the first alignment base film 14 is formed on the first electrode 12, and then the first alignment base film 14 is aligned to thereby apply a pretilt angle thereto.

As an example, the first alignment base film 14 is formed in such a manner that the polar angle of a pretilt angle applied to a liquid crystal (or mesogen) is between 2 and 10 degrees. A first reactive mesogen film is formed on the first alignment base film 14. The first alignment base film 14 and the first reactive mesogen film 16 may form a first alignment film.

Mesogen within the first reactive mesogen film may be arranged in accordance with the pretilt angle applied to the first alignment base film 14. Specifically, as to the mesogen within the first reactive mesogen film, the azimuthal angle of the director of the mesogen is arranged in accordance with the azimuthal angle of the pretilt angle applied to the first alignment base film 14, and the first polar angle of the director of the mesogen may be determined in accordance with the polar angle of the pretilt angle applied to the first alignment base film 14.

As described above, when the first alignment base film 14 is formed in such a manner that the polar angle of the pretilt angle applied to the liquid crystal (or mesogen) is between 2 and 10 degrees, the first polar angle of the mesogen within the reactive mesogen film 16 may be between 2 and 10 degrees.

Next, the first substrate 10 is subjected to heat treatment, thereby removing the solvent within the first reactive mesogen film 16. However, the process of removing the solvent may be omitted.

Thereafter, the first reactive mesogen film is irradiated with light such as UV or the like, and the reactive mesogen within the first reactive mesogen film is polymerized, and therefore the first alignment control film 16' containing the polymerized mesogen 16a is formed. The first alignment control film 16' may exhibit the secondary polar angle which is almost the same as the first polar angle applied by the alignment base film 14. However, the secondary polar angle of the polymerized mesogen 16a may be slightly different from the first polar angle due to a light irradiation amount in the optical polymerizing step. In this manner, the polymerized mesogen having the secondary polar angles which are different from each other in a plurality of domains may be formed. The irradiation of the light may be performed for about 30 minutes.

An electric field may be applied to the first reactive mesogen film while being irradiated with light. This may be performed using an external electrode (not shown) different from the first electrode 12. When the electric field is applied to the first reactive mesogen film, a director of the reactive mesogen within the first reactive mesogen film may be rotated in an electric field direction. In this manner, when the reactive mesogen whose director is rotated in the electric field direction is polymerized by the light irradiation, a secondary polar angle of the polymerized mesogen 16a within the first alignment control film 16' may be more accurately controlled. As an example, the secondary polar angle of the polymerized mesogen 16a within the first alignment control film 16' may be larger than the polar angle of the pretilt angle of the first alignment base film 14 adjacent to the first alignment control film 16'.

Meanwhile, as described above, in a case in which the process of removing the solvent within the first reactive mesogen film is omitted, the solvent may remain in the first reactive mesogen film when optically polymerizing the reactive mesogen within the first reactive mesogen film. In this case, the polymerized mesogen 16a may be arranged so as to further correspond to the pretilt angle applied by the first alignment base film 14 (in a case of not applying an electric field), or arranged so as to further correspond to the electric field direction (in a case of applying the electric field).

Referring to FIG. 9, on the second substrate 20, a second electrode 22, a second alignment base film 24, and a second alignment control film 26' are formed. The second alignment control film 26' contains the polymerized mesogen 26a, and the second alignment base film 24 and the second alignment control film 26' may form a second alignment film UA. A material or method of forming the second electrode 22, the second alignment base film 24, and the second alignment control film 26' may be the same as a material or method of forming the first electrode 12, the first alignment base film 14, and the first alignment control film 16' which have been described with reference to FIGS. 4 and 8. However, the present invention is not limited thereto, and any one of the first alignment control film 16' and the second alignment control film 26' may be omitted.

Thereafter, the first substrate 10 and the second substrate 20 are arranged and then combined so that the second electrode 22 faces the first substrate 10. Next, a liquid crystal is injected between the first substrate 10 and the second substrate 20 to thereby form a liquid crystal layer 30. In this instance, reactive mesogen may be injected between the first substrate 10 and the second substrate 20, together with the liquid crystal. The liquid crystals forming the liquid crystal layer 30 may be a liquid crystal having a vertical rotation mode which has positive dielectric anisotropy, and for example, may be a liquid crystal of a twisted nematic (TN) mode, an optically compensated bend (OCB) mode, or an electrically controlled birefringence (ECB) mode. In the case of the liquid crystal having the TN mode, the first substrate 10 and the second substrate 20 are combined in such a manner that the azimuthal angles of the pretilt angles of the first alignment base film 14 and the second alignment base film 24 intersect with each other, for example, are orthogonal to each other.

Enhanced anchoring energy is exerted on the liquid crystal adjacent to the alignment control films 16' and 26' by the polymerized mesogen 16a, 26a in the alignment control films 16' and 26', and therefore the director of the liquid crystal may be stabilized or fixed. As a result, a threshold voltage of the liquid crystal display device may be reduced, response speed may be improved, and display quality may be improved due to improved black visibility.

Meanwhile, the phase delay value of any one of the alignment control films 16' and 26' is small so as to avoid substantially affecting the phase delay value of the liquid crystal layer 30. For this, the phase delay value of any one of the alignment control films 16' and 26' may not be more than 0.1 times the phase delay value of the liquid crystal layer 30.

This is represented by the following inequation. For this, the thickness of each of the alignment control films 16' and 26' may be several or several tens of nm.

[Inequation]

$$\Delta nd \leq 0.1 \Delta n'd'$$

Here, n and d respectively denote a refractive index and the thickness of the alignment control film, and n' and d' respectively denote a refractive index and the thickness of the liquid crystal layer.

Figure 10:
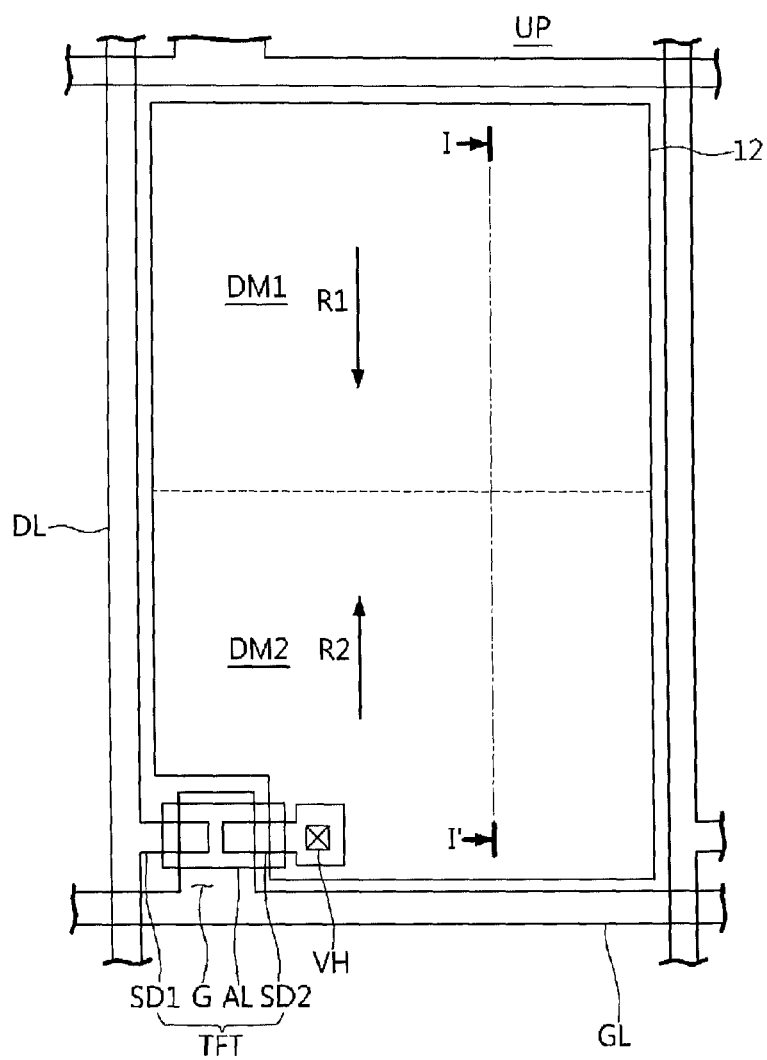
FIG. 10 is a layout view showing a liquid crystal display device according to another exemplary embodiment of the present invention.

FIG. 10 is a layout view showing a liquid crystal display device according to another exemplary embodiment of the present invention, and is a drawing which is limited to the first substrate. FIGS. 11 to 14 are cross-sectional views showing a manufacturing method of a liquid crystal display device according to yet another exemplary embodiment of the present invention. The liquid crystal display device according to the present embodiment includes a liquid crystal having negative dielectric anisotropy, and a manufacturing method according to the present embodiment is substantially the same as the manufacturing method which has been described with reference to FIGS. 1 to 3 excluding the following.

Figure 11:
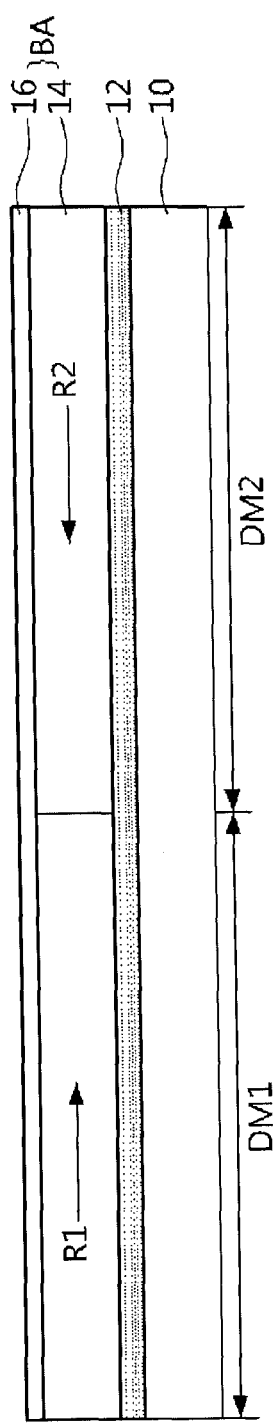
FIGS. 11 to 14 are cross-sectional views showing a manufacturing method of a liquid crystal display device according to yet another exemplary embodiment of the present invention.

Referring to FIGS. 10 and 11, a first electrode 12 may be formed on the first electrode 10. Before forming the first electrode 12, a thin film transistor (TFT), a gate line (GL), and a data line (DL) may be formed on the first substrate 10. Specifically, on the first substrate 10, the gate line (GL) and the gate electrode (G) protruded from the gate line (GL) may be formed. A gate insulating film (not shown) is formed on the gate electrode (G), and a semiconductor layer (AL) which crosses an upper portion of the gate electrode (G) may be formed on the gate insulating film.

Thereafter, the data line (DL) crossing an upper portion of the gate line (GL), and source/drain electrodes (SD1 and SD2) which are respectively connected to both end portions of the semiconductor layer (AL) may be formed. One of the source/drain electrodes (SD1 and SD2) is protruded from the data line (DL). The gate electrode (G), the semiconductor layer (AL), and the source/drain electrodes (SD1 and SD2) constitute the thin film transistor (TFT). An interlayer insulating film (not shown) is formed on the thin film transistor (TFT), and then a via hole for exposing the other one of the source/drain electrodes (SD1 and SD2) is formed within the interlayer insulating layer. Next, the first electrode 12 is formed on the interlayer insulating layer on which the via hole (VH) is formed. As a result, the first electrode 12 is electrically connected with the other one of the source/drain electrodes (SD1 and SD2), that is, the thin film transistor (TFT).

A unit pixel (UP) is defined by the intersection of the gate line (GL) and the data line (DL), and the thin film transistor (TFT) and the first electrode 12 may be disposed within the unit pixel (UP). The first electrode 12 may not include an opening.

The first alignment base film 14 may be formed on the first electrode 12. The first alignment base film 14 may be formed using poly-amic acid, poly-imide, lecithin, nylon, or PVA. Next, the first alignment base film 14 is aligned to thereby apply a pretilt angle for allowing liquid crystal (or mesogen) to be arranged. A part of the first alignment base film 14, that is, a first domain (DM1) is aligned in a first direction (R1), and the other part thereof is aligned in a second direction (R2) different from the first direction (R1). The first alignment direction (R1) and the second alignment direction (R2) are merely an example, and the present invention is not limited thereto. Such an alignment may be carried out by a physical rubbing method, an optical alignment method, or a groove patterning method, and the first domain (DM1) may be aligned in the first direction (R1) in a state in which the second domain (DM2) is covered using a mask, and the second domain (DM2) may be aligned in a second direction (R2) in a state in which the first domain (DM1) is covered using a mask.

The first alignment base film 14 may be a horizontal alignment film, a vertical alignment film, or a double-layer thereof. When the first alignment base film 14 is the double-layer of the horizontal alignment film and the vertical alignment film, the polar angle of a pretilt angle applied to a liquid crystal (or mesogen) by the first alignment base film 14 may be adjusted by adjusting the laminated order of the two alignment films and the thickness thereof. When a plurality of domains are formed as described above, azimuthal angles of the pretilt angles applied to the liquid crystal (or mesogen) are made different for each domain. In addition, a combination of the vertical alignment film and the horizontal alignment film differs in the plurality of domains, the polar angle of the pretilt angle applied to the liquid crystal (or mesogen) is made different for each domain. As an example, the first alignment base film 14 is formed in such a manner that the polar angle of the pretilt angle applied to the liquid crystal (or mesogen) is between 80 and 90 degrees.

The reactive mesogen film 16 may be formed on the first alignment base film 14. The first alignment base film 14 and the reactive mesogen film 16 may form the first alignment film (BA). The mesogen within the reactive mesogen film 16 may be arranged in accordance with the pretilt angle applied to the first alignment base film 14. Specifically, as to the mesogen within the reactive mesogen film 16, the azimuthal angle of the director of the mesogen is arranged in accordance with the azimuthal angle of the pretilt angle applied to the first alignment base film 14, and the first polar angle of the director of the mesogen may be determined in accordance with the polar angle of the pretilt angle applied to the first alignment base film 14.

As described above, within the first domain (DM1), the azimuthal angle of the mesogen within the reactive mesogen film 16 may be the first direction (R1), and within the second domain (DM2), the azimuthal angle of the mesogen within the reactive mesogen film 16 may be the second direction (R2).

In addition, when the first alignment base film 14 is formed in such a manner that the polar angle of the pretilt angle applied to the liquid crystal (or mesogen) is between 80 and 90 degrees, the first polar angle of the mesogen within the reactive mesogen film 16 may be between 80 and 90 degrees.

Figure 12:
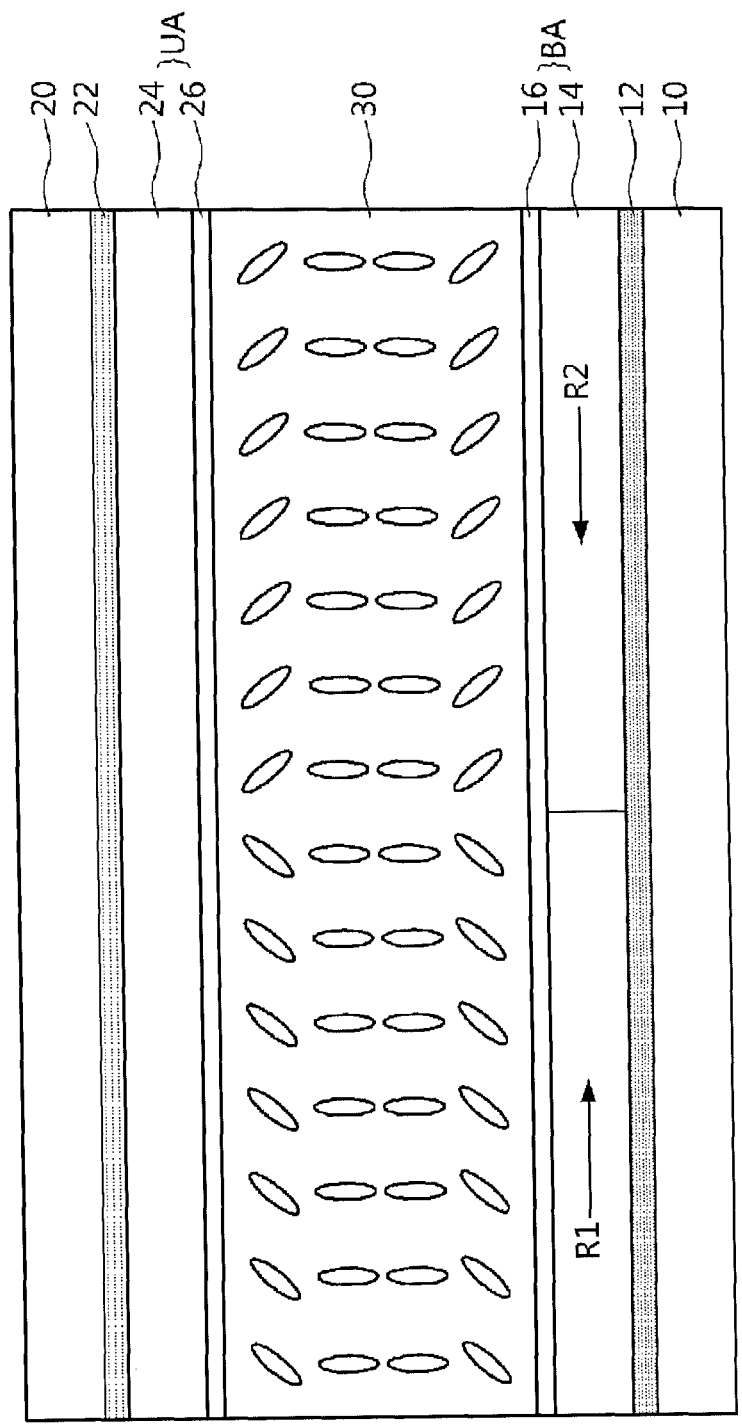

Referring to FIGS. 10 and 12, on the second substrate 20, a second electrode 22, a second alignment base film 24, and a second reactive mesogen film 26 are sequentially formed. The second alignment base film 24 and the second reactive mesogen film 26 may form a second alignment film (UA). A material or method of forming the second electrode 22, the second alignment base film 24, and the second reactive mesogen film 26 may be the same as a material or method of forming the first electrode 12, the first alignment base film 14, and the first reactive mesogen film 16 which have been described with reference to FIG. 11. However, the present invention is not limited thereto, and any one of the first reactive mesogen film 16 and the second reactive mesogen film 26 may be omitted.

Thereafter, the first substrate 10 and the second substrate 20 are arranged and then combined so that the second electrode 22 faces the first substrate 10. Next, liquid crystal is injected between the first substrate 10 and the second substrate 20 to thereby form a liquid crystal layer 30. In this instance, reactive mesogen may be injected between the first substrate 10 and the second substrate 20, together with the liquid crystal. The liquid crystals forming the liquid crystal layer 30 may have negative dielectric anisotropy, and the liquid crystal display device according to the present embodiment may implement a vertical alignment (VA) mode.

The liquid crystals adjacent to the alignment films (BA and UA) among the liquid crystals forming the liquid crystal layer 30 may be arranged in accordance with the pretilt angle applied to the alignment films (BA and UA), specifically, the pretilt angle applied to the alignment base films 14 and 24 and/or the reactive mesogen within the reactive mesogen films 16 and 26. As an example, as described above, azimuthal angles of the liquid crystals adjacent to the first alignment film (BA) among the liquid crystals forming the liquid crystal layer 30 within the first domain (DM1) may be a first direction (R1), and azimuthal angles of the liquid crystals adjacent to the first alignment film (BA) among the liquid crystals forming the liquid crystal layer 30 within the second domain (DM2) may be a second direction (R2).

In addition, when the polar angle of the pretilt angle applied to the alignment base films 14 and 24 and/or the reactive mesogen within the reactive mesogen films 16 and 26 is between 80 and 90 degrees, the polar angle of the liquid crystals adjacent to the alignment films (BA and UA) among the liquid crystals forming the liquid crystal layer 30 may be between 80 and 90 degrees.

Figure 13:
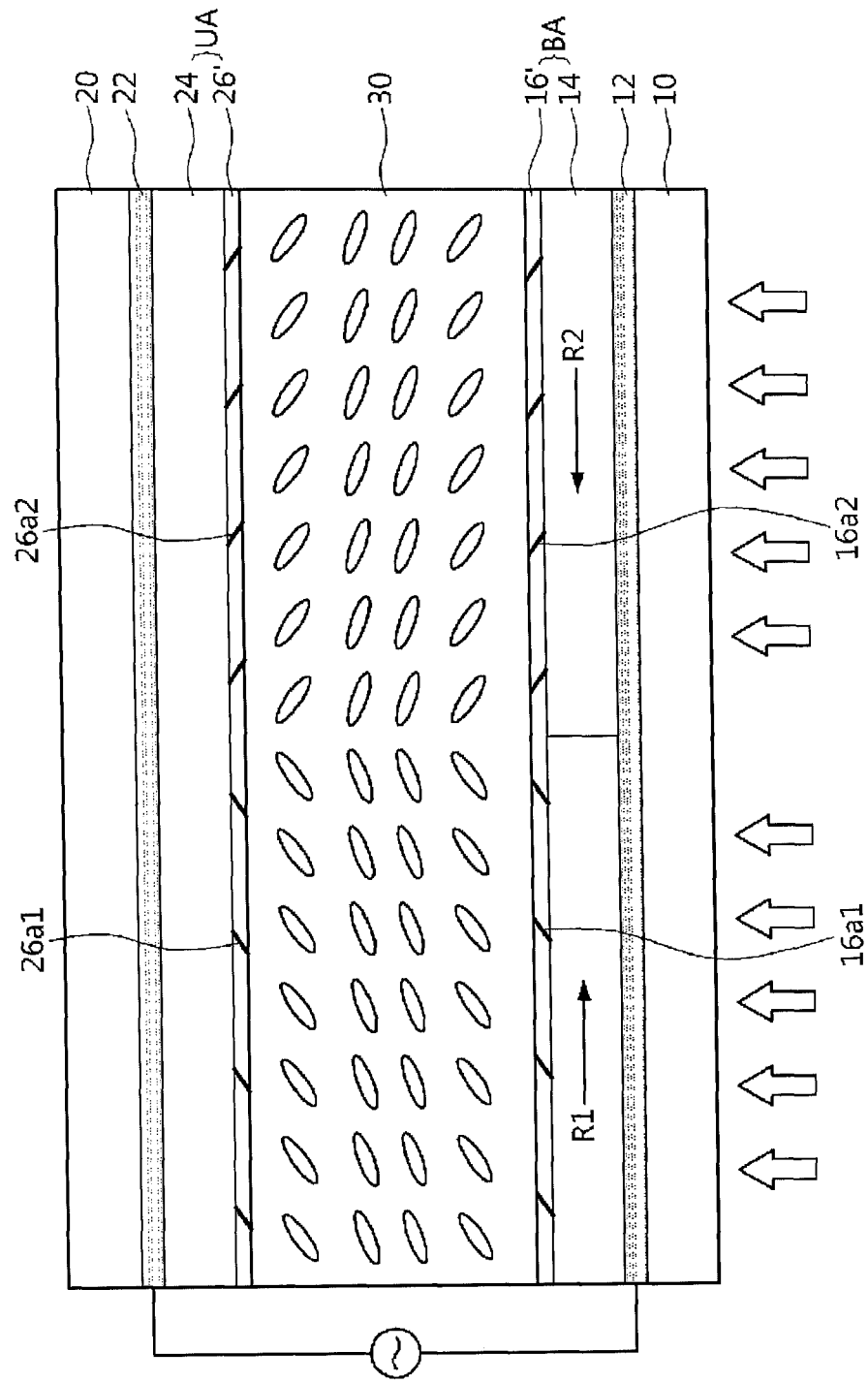

Referring to FIGS. 10 and 13, by applying an electric field between the first electrode 12 and the second electrode 22, the liquid crystals within the liquid crystal layer 30 may be arranged. Specifically, when the liquid crystal has negative dielectric anisotropy, a director of the liquid crystal is rotated in a direction perpendicular to an electric field direction. As a result, the polar angle of the liquid crystals adjacent to the alignment films (BA and UA) among the liquid crystals forming the liquid crystal layer 30 may be reduced, and the polar angle of the reactive mesogen within the reactive mesogen films 16 and 26 may be accordingly reduced. However, the degree of rotation of the director of the liquid crystal may differ in accordance with the size of the electric field applied between the first electrode 12 and the second electrode 22, and the degree of reduction in the polar angle of the reactive mesogen within the reactive mesogen films 16 and 26 may accordingly differ.

In this state, the first reactive mesogen film 16 and/or the second reactive mesogen film 26 is irradiated with light such as UV or the like, and the reactive mesogen within the reactive mesogen films 16 and 26 is polymerized, and therefore first and second alignment control films 16' and 26' are formed. In this instance, the alignment control films 16' and 26' may contain polymerized mesogen 16$a$1, 16$a$2, 26$a$1, and 26$a$2 which have the pretilt angles corresponding to an arrangement state of the liquid crystals within the liquid crystal layer 30 in a state in which the electric field is applied, specifically, have secondary polar angles. Here, the size of the electric field applied between the first electrode 12 and the second electrode 22 and/or a light irradiation amount differs, and therefore the secondary polar angle of the polymerized reactive mesogen may be adjusted. In this case, the secondary polar angle of the polymerized mesogen 16$a$1 and 16$a$2 within the first alignment control film 16' may be smaller than the polar angle of the first alignment base film 14 adjacent to the first alignment control film 16', and the secondary polar angle of the polymerized mesogen 26$a$1 and 26$a$2 within the second alignment control film 26' may be smaller than the polar angle of the second alignment base film 24 adjacent to the second alignment control film 26'.

In another embodiment, the reactive mesogen within the reactive mesogen films 16 and 26 are optically polymerized in a state in which the electric field is not applied between the first electrode 12 and the second electrode 22, and therefore the first and second alignment control films 16' and 26' containing the polymerized mesogen 16$a$1, 16$a$2, 26$a$1, and 26$a$2 may be formed. In this case, the polymerized mesogen 16$a$1, 16$a$2, 26$a$1, and 26$a$2 within the alignment control films 16' and 26' may exhibit secondary polar angle nearly the same as the first polar angle applied by the alignment base films 14 and 24. However, the secondary polar angle of the polymerized mesogen 16a1, 16a2, 26a1, and 26a2 may be slightly different from the first polar angle due to a change in the light irradiation amount in the optical polymerizing step.

Meanwhile, in a case in which the process of removing the solvent within the reactive mesogen films 16 and 26 is omitted as described above, the solvent may remain in the reactive mesogen films 16 and 26 when optically polymerizing the reactive mesogen within the reactive mesogen films 16 and 26. In this case, the polymerized mesogen 16a1, 16a2, 26a1, and 26a2 may be arranged so as to further correspond to an arrangement state of the liquid crystals within the liquid crystal layer 30 (in a case of applying an electric field), or arranged so as to further correspond to the pretilt angle applied by the alignment base films 14 and 24 (in a case of not applying the electric field).

Figure 14:
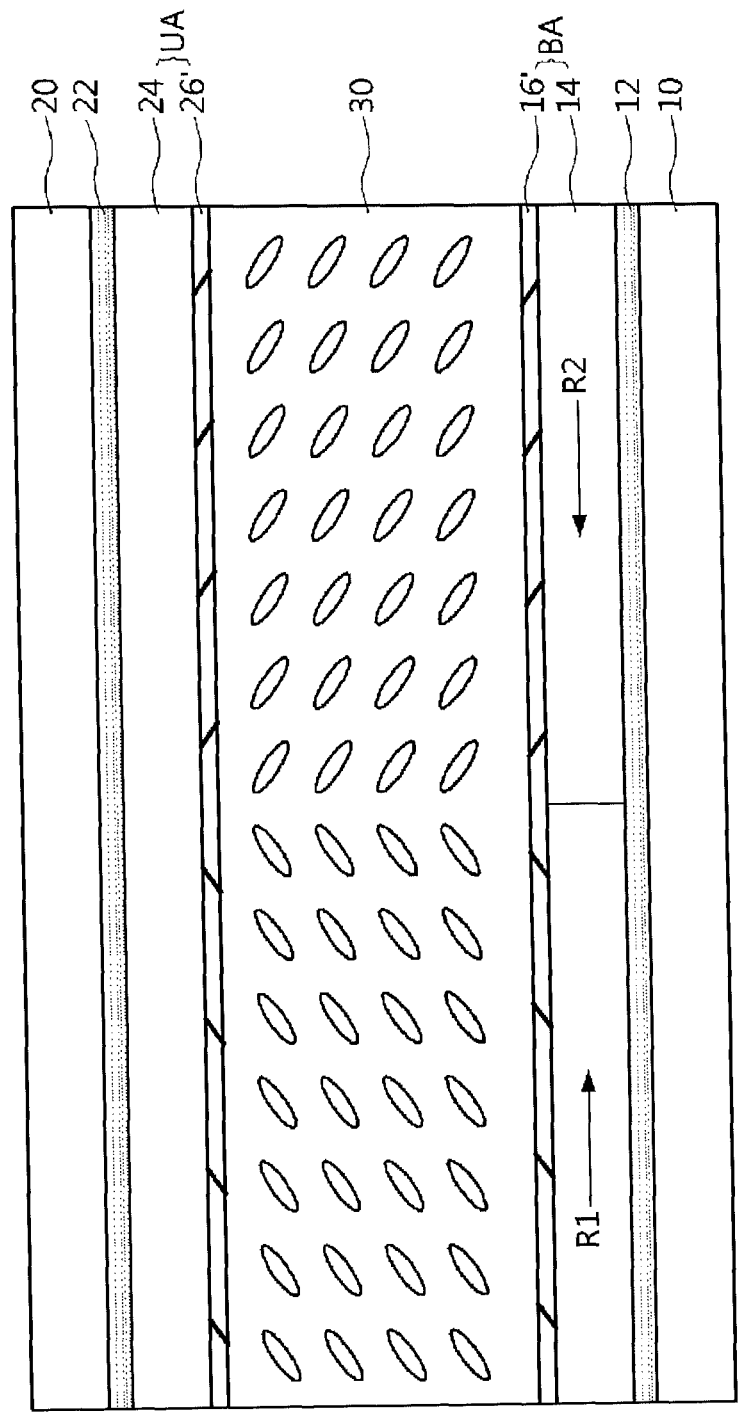

Referring to FIGS. 10 and 14, the electric field applied between the first electrode 12 and the second electrode 22 is removed. Even after the electric field is removed, the polymerized mesogen 16a1, 16a2, 26a1, and 26a within the first and second alignment control films 16' and 26' may maintain the secondary polar angle. In addition, the polymerized mesogen 16a1, 16a2, 26a1, and 26a may maintain the azimuthal angle applied to the mesogen within the reactive mesogen films 16 and 26, and exhibit an azimuthal angle of the first direction (R1) within the first domain (DM1), and an azimuthal angle of the second direction (R2) within the second domain (DM2).

The alignment control films 16' and 26' may have enhanced anchoring energy compared to the anchoring energy of the alignment base films 14 and 24. In particular, when the alignment base films 14 and 24 are an optically aligned film exhibiting slightly weaker anchoring energy, the anchoring energy may be supplemented or enhanced by the alignment control films 16' and 26'. In this manner, enhanced anchoring energy is exerted on the liquid crystal adjacent to the alignment control films 16' and 26' by the polymerized mesogen 16a1, 16a2, 26a1, and 26a within the alignment control films 16' and 26', and therefore the director of the liquid crystal may be stabilized or fixed. As a result, a threshold voltage of the liquid crystal display device may be reduced, response speed may be improved, and display quality may be improved due to improved black visibility.

In addition, in order to attain a wide viewing angle of a liquid crystal display device having a VA mode, the electrode is subjected to patterning, or a protrusion is formed under the electrode, and therefore the azimuthal angles of the liquid crystal are made different for each domain by adjusting the electric field direction affecting the liquid crystal to thereby implement a multi-domain. However, in the present embodiment, without performing the electrode patterning or forming the protrusion under the electrode, the azimuthal angles of the liquid crystals are made different for each domain, thereby implementing a multi-domain. Therefore, an opening such as a slit or the like is not required to be formed within the first electrode, and the protrusion is not required to be formed under the electrode. As a result, a light shielding film for shielding the vicinity of the opening or the protrusion is not required to be formed. However, the invention is not limited thereto, and as a method for further stabilizing the director of the liquid crystal, the electrode patterning or the protrusion formation under the electrode may be further performed.

Hereinafter, Examples will be described for better understanding of the present invention. However, the following Examples are merely for better understanding of the present invention, and the present invention is not limited to the following Examples.

Manufacturing Example 1

An ITO layer was formed on a glass substrate to thereby form an electrode, and a horizontal alignment film (AL-22620, manufactured by JSR) with a thickness of 100 nm was formed on the electrode. A rubbing process was performed on the horizontal alignment film. A mixture in which a PGMEA solvent, a polymerization initiator (IRGACURE 651, manufactured by Ciba chemical), and a reactive mesogen (manufactured by BASF) were mixed and applied, with a thickness of several nm, on the horizontal alignment film on which the rubbing process was performed, thereby forming a reactive mesogen film. In this instance, the reactive mesogen was contained in the mixture at 0.5 wt %. The alignment film and the reactive mesogen film formed an alignment control film.

Manufacturing Example 2

A sample was manufactured using the same method as that of manufacturing Example 1, except that the reactive mesogen film was formed using the mixture in which the reactive mesogen was contained at 1 wt %.

Manufacturing Example 3

A sample was manufactured using the same method as that of manufacturing Example 1, except that the reactive mesogen film was formed using the mixture in which the reactive mesogen was contained at 2 wt %.

Comparative Example 1

A sample was manufactured using the same method as that of manufacturing Example 1, except that the reactive mesogen film was not formed.

Figure 15:
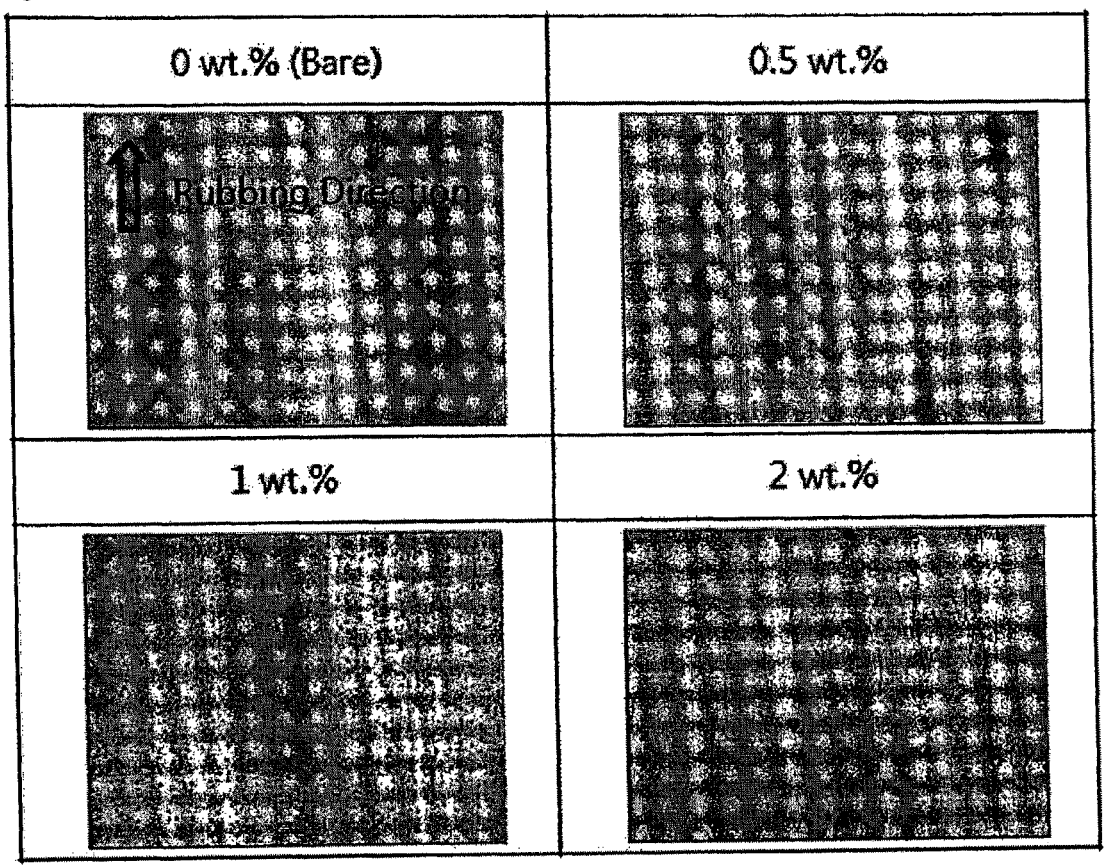
FIG. 15 is photographs showing coating characteristics of an alignment control film in each sample according to manufacturing examples 1 to 3 and comparative example 1.
Figure 16:
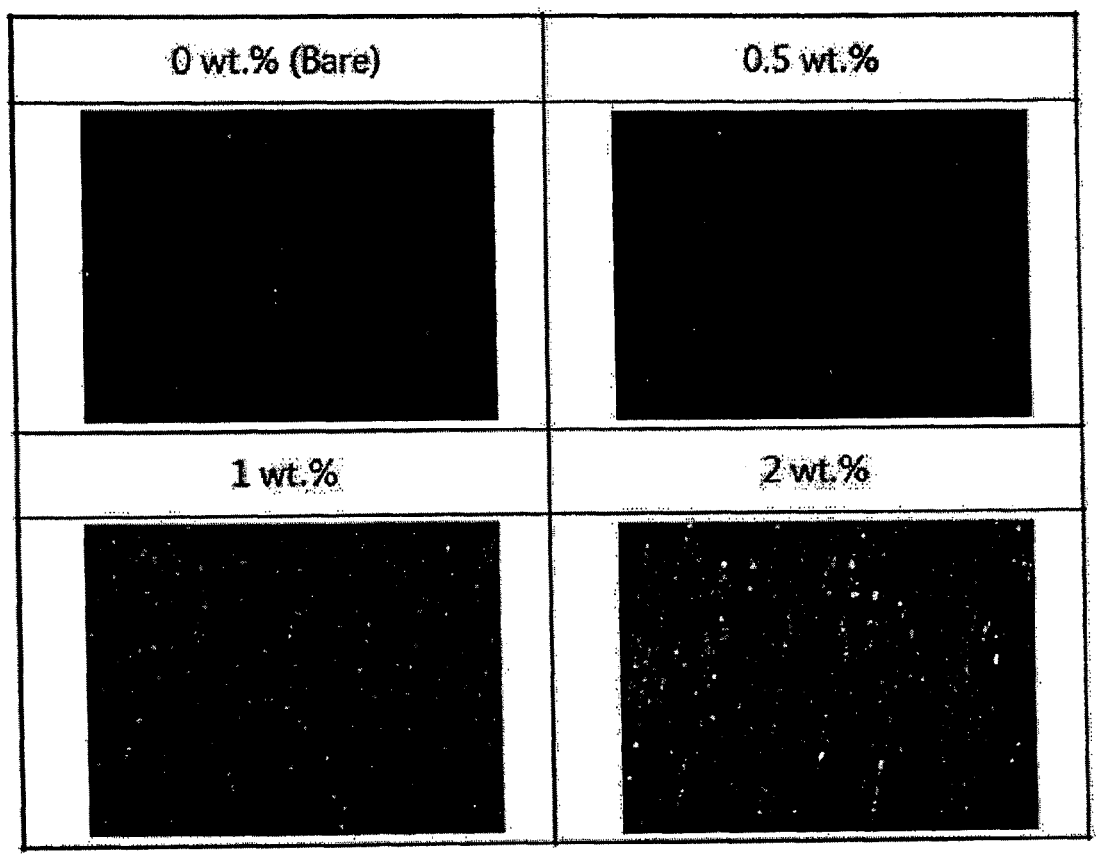
FIG. 16 is photographs showing black visibility according to manufacturing examples 1 to 3 and comparative example 1.

FIG. 15 is photographs showing coating characteristics of an alignment control film in each sample according to manufacturing Examples 1 to 3 and comparative Example 1, and FIG. 16 is photographs showing black visibility according to manufacturing Examples 1 to 3 and comparative Example 1.

Specifically, in photographs of FIG. 16, each sample (a lower substrate) according to manufacturing Examples 1 to 3 and comparative Example 1 and an upper substrate are combined, liquid crystal is injected between the substrates to thereby manufacture a liquid crystal display device, and then black visibility was measured.

Referring to FIGS. 15 and 16, when the concentration of the reactive mesogen within a mixture in which the reactive mesogen was mixed in PGMEA forming a reactive mesogen film was less than 1 wt %, it was found that an agglomeration phenomenon of the polymerized mesogen did not occur. As a result, black visibility was further improved. Therefore, in order to improve black visibility, the concentration of the reactive mesogen within the mixture forming the reactive mesogen film may be controlled at 1 wt % or less.

Manufacturing Example 4

An ITO layer was formed on a first substrate that is a glass substrate, to thereby form a first electrode, and a first horizontal alignment film (RN-2174, manufactured by Nissan) with a thickness of 100 nm was formed on the first electrode. Next, the first horizontal alignment film was optically aligned.

A mixture in which a PGMEA solvent, a polymerization initiator (IRGACURE 651, manufactured by Ciba chemical), and a reactive mesogen (manufactured by BASF) were mixed and applied, with a thickness of several nm, on the first horizontal alignment film having been optically aligned, thereby forming a first reactive mesogen film. In this instance, the reactive mesogen was contained in the mixture at 0.7 wt % or less. Meanwhile, an ITO layer was formed on a second substrate that is a glass substrate, to thereby form a second electrode, and a second horizontal alignment film (RN-2174, manufactured by Nissan) with a thickness of 100 nm was formed on the second electrode. Next, the second horizontal alignment film was optically aligned. The mixture was applied with a thickness of several nm on the second horizontal alignment film having been optically aligned, thereby forming a second reactive mesogen film. Next, the substrates were combined, and liquid crystals with a TN mode were injected. In a state in which an electric field was applied between the first electrode and the second electrode, the first reactive mesogen film and the second reactive mesogen film were irradiated with UV, and therefore alignment control films containing the polymerized mesogen were formed.

Manufacturing Example 5

A liquid crystal display device was manufactured in the same method as that of manufacturing Example 4, except that the alignment control films were formed by polymerizing the reactive mesogen by UV irradiation in a state in which the electric field was not applied between the first electrode and the second electrode.

Comparative Example 2

A liquid crystal display device was manufactured in the same method as that of manufacturing Example 4, except that the process of forming the first and second reactive mesogen films and the process of forming the alignment control films by polymerizing the first and second reactive mesogen films were omitted.

Figure 17:
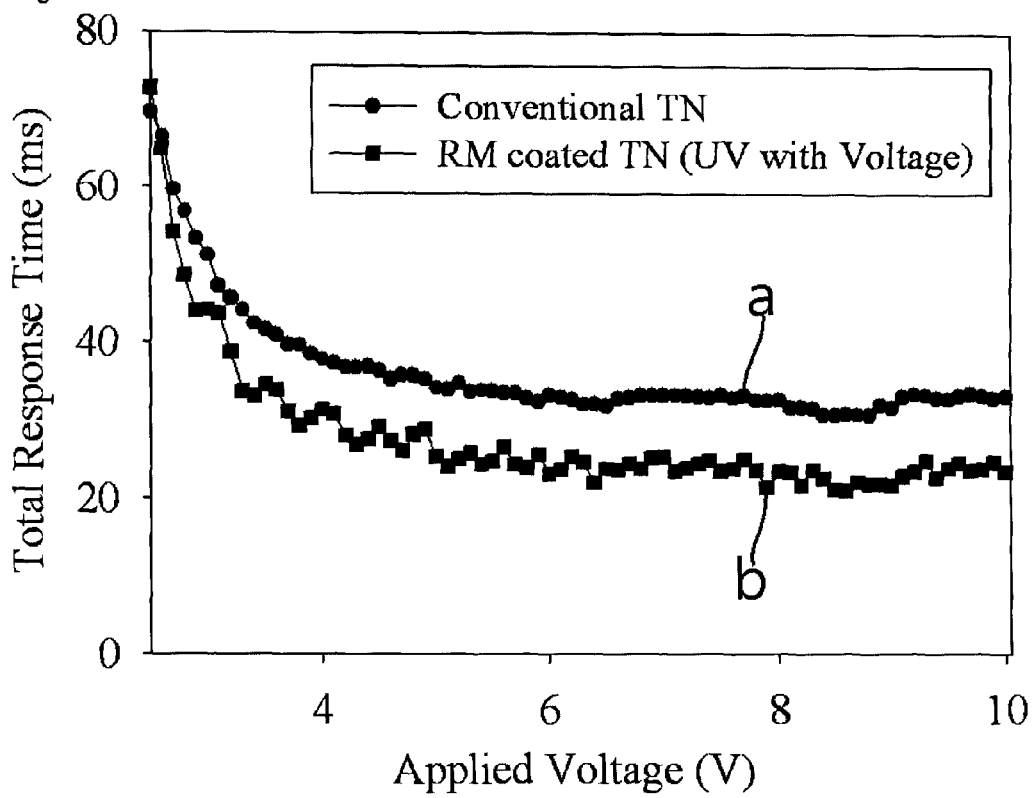
FIG. 17 is a graph showing response speeds of liquid crystal display devices according to manufacturing example 4 and comparative example 2.

FIG. 17 is a graph showing response speeds of liquid crystal display devices according to manufacturing Example 4 and comparative Example 2.

Referring to FIG. 17, it was found that the response speed of liquid crystal display device (b) according to manufacturing Example 4 was faster than the response speed of liquid crystal display device (a) according to Comparative Example 2 that is a liquid crystal display device with a general TN mode.

Figure 18:
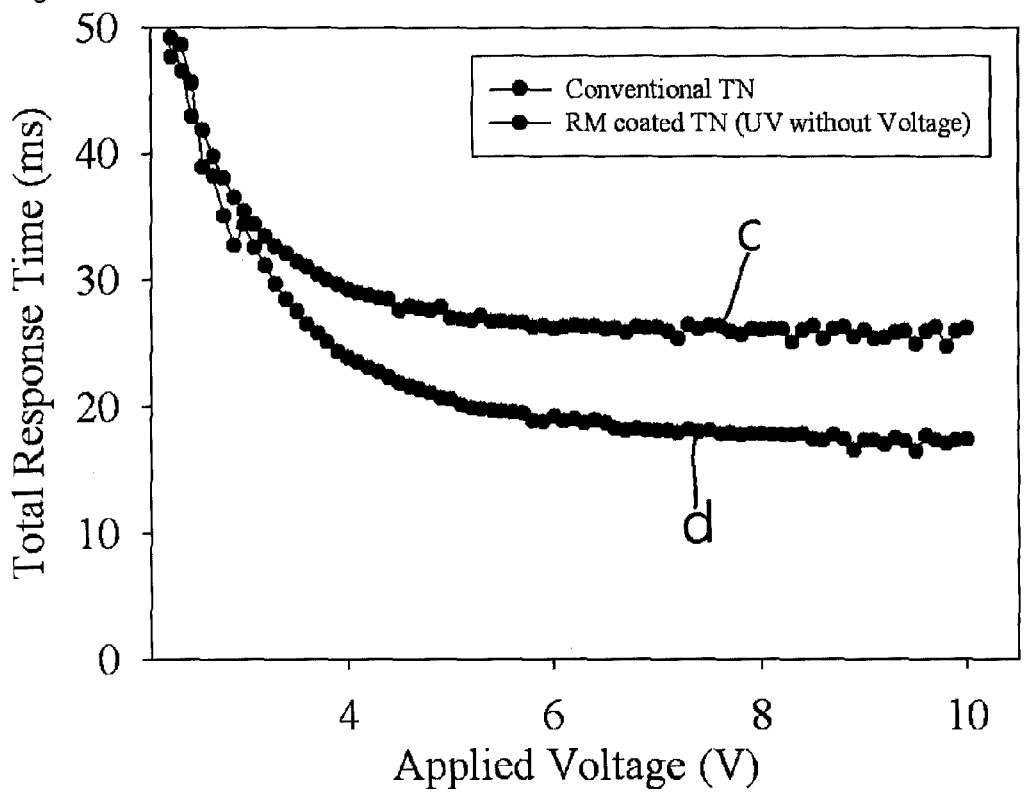
FIG. 18 is a graph showing response speeds of liquid crystal display devices according to manufacturing example 5 and comparative example 2.

FIG. 18 is a graph showing response speeds of liquid crystal display devices according to manufacturing Example 5 and comparative Example 2.

Referring to FIG. 18, it was found that the response speed of liquid crystal display device (d) according to manufacturing Example 5 was faster than the response speed of a liquid crystal display device (c) according to Comparative Example 2 that is a liquid crystal display device with a general TN mode. Therefore, it was found that the response speed was improved even though the electric field was not applied between the electrodes when the alignment control films were formed by polymerizing the reactive mesogen films.

Figure 19:
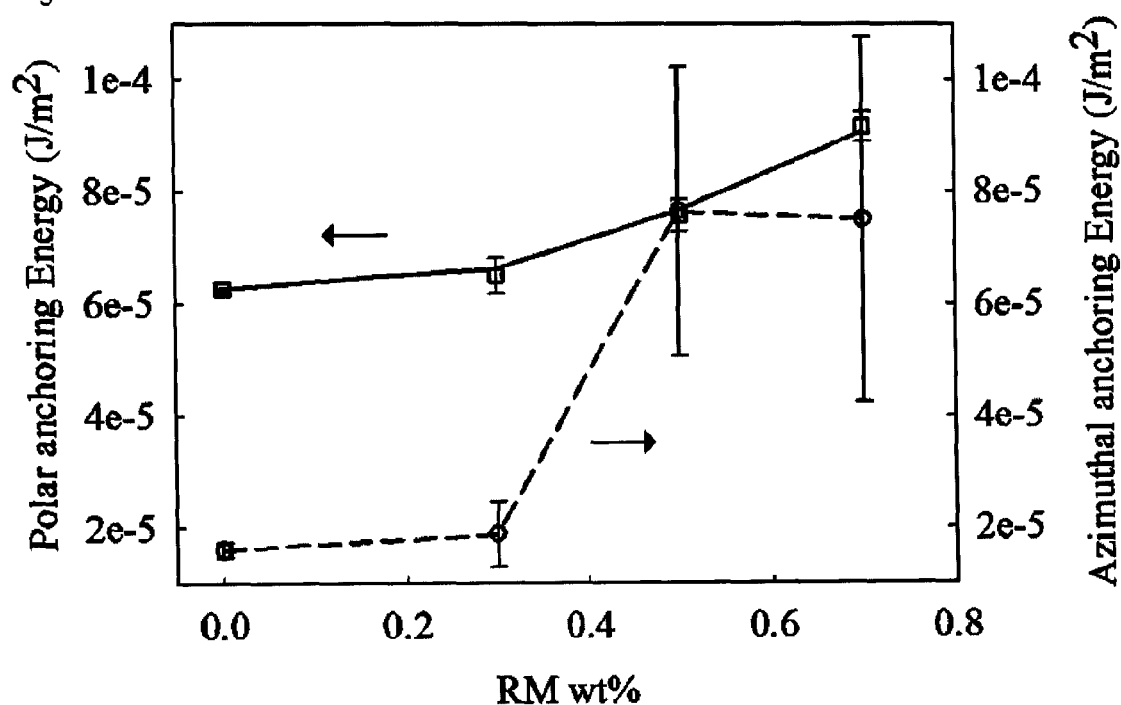
FIG. 19 is a graph showing polar anchoring energy and azimuthal anchoring energy according to the concentration of reactive mesogen within a mixture used in forming a reactive mesogen film.

FIG. 19 is a graph showing polar anchoring energy and azimuthal anchoring energy according to the concentration of reactive mesogen within a mixture used in forming a reactive mesogen film.

Referring to FIG. 19, it was found that the polar anchoring energy and the azimuthal anchoring energy were improved when the reactive mesogen was contained compared to when the reactive mesogen was not contained.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A liquid crystal display device comprising:
a first substrate and a second substrate configured to face each other;
a liquid crystal layer positioned between the first and second substrates;
a first alignment film positioned between the liquid crystal layer and the first substrate; and
a second alignment film positioned between the liquid crystal layer and the second substrate,
wherein at least one of the first alignment film and the second alignment film includes a double layer of an alignment base film that is aligned so as to have a pretilt angle and an alignment control film that has polymerized mesogens;
wherein an anchoring energy of the alignment control film is at least about 22% larger than an anchoring energy of the alignment base film;
wherein a polar angle of the polymerized mesogen within the alignment control film is larger than a polar angle of the pretilt angle of the alignment base film when the liquid crystal layer includes a liquid crystal having positive dielectric anisotropy, and
wherein the polar angle of the polymerized mesogen within the alignment control film is smaller than the polar angle of the pretilt angle of the alignment base film when the liquid crystal layer includes a liquid crystal having negative dielectric anisotropy.

2. The liquid crystal display device of claim 1, wherein the alignment control film has a phase delay value of no more than 0.1 times the phase delay value of the liquid crystal layer.

3. The liquid crystal display device of claim 1, wherein the alignment base film is a film that is optically aligned.

4. The liquid crystal display device of claim 1, further comprising:
a first electrode and a second electrode positioned between the first alignment film and the first substrate.

5. The liquid crystal display device of claim 4, further comprising:
a first electrode positioned between the first alignment film and the first substrate; and
a second electrode positioned between the second alignment film and the second substrate.

6. The liquid crystal display device of claim 1, wherein the alignment base film includes a first domain having a first alignment direction, and a second domain having a second alignment direction.

7. A manufacturing method of a liquid crystal display device, comprising:
forming a first alignment base film aligned on a first substrate so as to have a pretilt angle;

forming a first reactive mesogen film containing reactive mesogens on the first alignment base film;

combining a second substrate and the first substrate on which the first alignment base film and the first reactive mesogen film are formed;

forming a liquid crystal layer having liquid crystals between the combined first and second substrates;

applying an electric field to the liquid crystal layer to align the liquid crystals within the liquid crystal layer; and polymerizing the reactive mesogens within the first reactive mesogen film in a state in which the liquid crystals are aligned to have an arrangement state according to the electric field to thereby form a first alignment control film including polymerized mesogens, wherein the polymerized mesogens in the first alignment control film have a pretilt angle corresponding to the arrangement state of liquid crystals within the liquid crystal layer;

wherein an anchoring energy of the first alignment control film is at least about 22% larger than an anchoring energy of the first alignment base film.

8. The manufacturing method of claim 7, wherein the electric field is applied between a first electrode and a second electrode which are formed on at least one of the substrates.

9. The manufacturing method of claim 7, wherein the polymerizing is performed in such a manner that the reactive meso, en film is irradiated with light.

10. The manufacturing method of claim 7, wherein the reactive mesogen film is formed using a mixture containing the reactive mesogens and a solvent; and wherein the reactive mesogen is contained at about 0.5 to less than 1% with respect to the entire weight of the mixture used in forming the reactive mesogen film.

11. The manufacturing method of claim 10, wherein, when polymerizing the reactive mesogen within the reactive mesogen film, the solvent remains within the reactive mesogen film.

12. The manufacturing method of claim 7, wherein the alignment base film is a film that is optically aligned.

13. The manufacturing method of claim 7, wherein the alignment base film includes a first domain having a first align men direction, and a second domain having a second alignment direction.

14. The manufacturing method of claim 7, further, before combining the first substrate and the second substrate, comprising:

forming a second alignment base film aligned on the second substrate so as to have a pretilt angle;

forming a second reactive mesogen film containing reactive mesogen on the second alignment base film; and after forming the liquid crystal layer, polymerizing the reactive mesogens within the second reactive mesogen film in a state in which the liquid crystals are aligned to have an arrangement state according to the electric field simultaneously with polymerizing the reactive mesogens within the first reactive mesogen film to thereby form a second alignment control film including polymerized mesogens, wherein the polymerized mesogens in the second alignment control film have a pretilt angle corresponding to the arrangement state of liquid crystals within the liquid crystal layer.

* * * * *